(Model.)

C. D. CARTER.
Spring Harrow Tooth.

No. 242,111. Patented May 31, 1881.

Witnesses.
A. W. Mortimer.
A. H. Kern

Inventor
C. D. Carter,
per
F. A. Lehmann,
Atty

UNITED STATES PATENT OFFICE.

CHARLES D. CARTER, OF GRAND RAPIDS, MICHIGAN.

SPRING HARROW-TOOTH.

SPECIFICATION forming part of Letters Patent No. 242,111, dated May 31, 1881.

Application filed April 4, 1881. (Model.)

*To all whom it may concern:*

Be it known that I, CHARLES D. CARTER, of Grand Rapids, in the county of Kent and State of Michigan, have invented certain new and useful Improvements in Spring Harrow-Teeth; and I do hereby declare the following to be a full, clear, and exact description of the invention, such as will enable others skilled in the art to which it pertains to make and use it, reference being had to the accompanying drawings, which form part of this specification.

My invention relates to an improvement in harrow-teeth; and it consists in the combination of a curved harrow-tooth having its upper end forked, with a suitable holding-frame for the spring, and a suitable means for connecting the spring and the harrow-tooth together, as will be more fully described hereinafter.

The object of my invention is to combine with a curved harrow-tooth a coiled spring, which spring is placed upon the top of the harrow-beam, and serves to allow the tooth to give backward whenever an obstruction is encountered, in such a manner that the tooth will ride over the obstruction without stopping the forward movement of the harrow.

Figure 1:
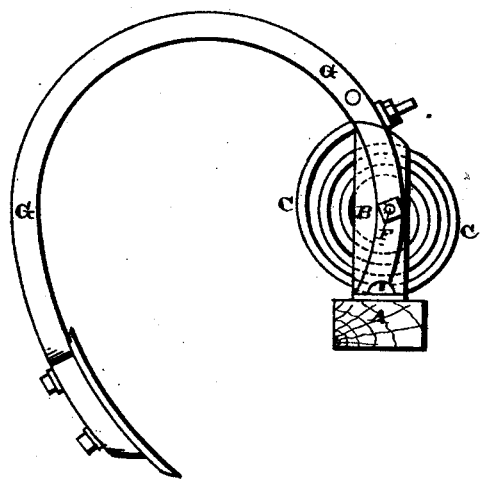
Figure 2:
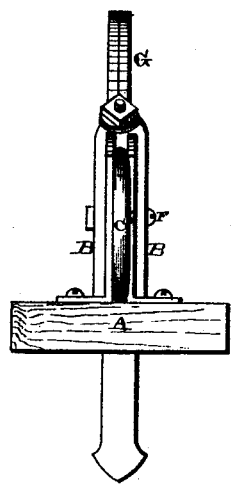

Figure 1 is a side elevation of my invention complete. Fig. 2 is a front view of the same.

A represents an ordinary harrow-beam, and B the frame in which the coiled spring C is held, and which frame may be made in two parts, as here shown, or only a single piece, as may be preferred. This frame is secured to the top of the beam by suitable clamping-bolts, and has the inner end of the spring fastened around the pivotal bolt F, upon which the curved harrow-tooth G moves. This harrow-tooth is preferably made of the curved form here shown, and has its upper end forked, so as to straddle over the top of the frame, as shown in Fig. 2. The spring after being coiled around any desired number of times inside of the frame has its outer end passed in between the divided ends of the tooth, and then the nut and washer are passed over it for the purpose of fastening the spring and tooth together. The screw-thread will be made of suitable length upon the upper end of this coiled spring, so that the tension of the spring can be increased or decreased at will simply by screwing or unscrewing this nut upon the end of the spring. The upper ends of the tooth are squared, so as to bear solidly upon the top of the frame B when the spring is at rest, and this squared end acts as a stop to prevent the lower end of the tooth from advancing beyond a certain point.

The lower end of the harrow-tooth may be provided with a reversible shovel, as is here shown, or a tooth of any desired construction. As the pivotal bolt upon which the tooth turns is placed forward a considerable distance in advance of the rear end of the tooth, and at a considerable distance above the lower end of the tooth, whenever an obstruction of any kind is encountered, as the harrow is being drawn along, the lower end of the tooth rises almost vertically, so as to ride over it without the slightest danger of breakage or of stopping the forward motion of the harrow.

Having thus described my invention, I claim—

1. In a harrow-tooth, the combination of the beam A, the frame B, the coiled spring, and the forked harrow-tooth, the spring and tooth being secured together in the manner shown.

2. The combination of the beam A, the frame B, the coiled spring, and the forked harrow-tooth, the spring and tooth being secured together, and the ends of the tooth being made to bear against the beam so as to act as a stop, substantially as set forth.

In testimony whereof I affix my signature in presence of two witnesses.

CHARLES D. CARTER.

Witnesses:
S. A. KENNEDY,
HARRY H. SNELL.